Nov 1, 1949.  C. J. GROSS  2,486,526
FIRE CONTROL APPARATUS
Filed March 3, 1945  7 Sheets-Sheet 3

Fig. 3.

Inventor
Charles J. Gross
By his Attorney

Inventor
Charles J. Gross
By his Attorney

Nov 1, 1949.  C. J. GROSS  2,486,526
FIRE CONTROL APPARATUS
Filed March 3, 1945  7 Sheets-Sheet 5

Inventor
Charles J. Gross
By his Attorney

Nov. 1, 1949.     C. J. GROSS     2,486,526
FIRE CONTROL APPARATUS

Filed March 3, 1945     7 Sheets-Sheet 7

Inventor
Charles J. Gross
By his Attorney

Patented Nov. 1, 1949

2,486,526

UNITED STATES PATENT OFFICE 2,486,526

FIRE CONTROL APPARATUS

Charles J. Gross, Melrose, Mass., assignor to United Shoe Machinery Corporation, Flemington, N. J., a corporation of New Jersey Application March 3, 1945, Serial No. 580,836

3 Claims. (Cl. 89—134)

This invention relates to apparatus for the control of gun fire, and more particularly to apparatus for interrupting the fire of automatic weapons such as machine guns. The invention is illustrated herein as embodied in a gun mount or turret of the type in which one or more guns, such as antiaircraft machine guns, are rotated about a vertical and a horizontal axis, commonly known as training or traverse and elevation, by a gunner who moves with the guns in train and tracks the targets, controls the movements of the guns in all directions, and fires the guns from a control station located at a point remote from the breech ends of the guns. While the illustrative embodiment of the invention is especially adapted to be installed on shipboard, or any other movable or stationary supporting structure, and to be used for operating a pair of parallel antiaircraft machine guns, it is to be understood that the invention is not limited in its applicability to any particular type of mount or gun, nor to the number of guns which may be carried by the mount.

Among the desirable features of gun mounts used against rapidly moving targets, such as aircraft, are the ease and rapidity with which the gunner can train the guns on the target and the rapidity with which he can fire the guns. Accordingly, antiaircraft gun mounts used on such war craft as naval vessels, for example, are ordinarily installed on weather decks, where the guns can be moved through their maximum angles of train and elevation and with minimum interference from the ship's structure. However, it is not always possible to insure with absolute certainty against the danger that some parts of the ship's structure or other objects which might come within the range of fire will be hit during the firing of automatic guns unless the gunner is sufficiently alert to interrupt the firing in certain areas. This places an additional strain upon the gunner, who is otherwise preoccupied during action against rapidly moving aircraft.

It is an object of the present invention to provide, in an antiaircraft gun mount of the type described above, having gun training and elevating mechanisms and firing means comprising a firing pedal connected to gun trigger operating mechanism for actuating the latter, apparatus which will automatically and without the intervention of the gunner render the firing means inoperative to actuate the trigger operating mechanism in predetermined positions of train and elevation of the guns, thereby to interrupt the firing while the guns are moved through certain areas designated beforehand as "safe" (i. e. "no fire") areas without, however, interrupting the normal operation of the mount, and which will permit the resumption of firing after the guns have been moved past the "safe" area.

With this object in view and in accordance with one feature of the invention, the fire control apparatus for automatically interrupting the firing of the guns comprises means associated with the gun training mechanism and with the trigger operating means and actuated in predetermined positions of the guns in train to disconnect the trigger operating means from the firing means, thereby to render the firing means inoperative to actuate the trigger operating means while the guns are being rotated through predetermined angles of train corresponding to the designated areas it is desired to protect. As herein illustrated, there is provided a cam secured to a fixed base of the mount, and a yieldable cam follower mounted for rotation circumferentially of the cam in a base housing mounted for rotation relatively to the fixed base, the rotatable base having standards secured thereto, each of which is adapted to support a cradle for one or more guns, so that the guns are rotated in a horizontal plane relatively to the fixed base of the mount. The cam is provided with high and low portions, corresponding to predetermined "safe" and "fire" areas, and the cam follower is connected to a pivotally mounted pawl, hereinafter referred to as the cam-operated pawl, forming part of the connection between the firing means and the trigger operating means, this pawl being normally in engagement with another pivotally mounted pawl, hereinafter referred to as the manually operated pawl, also forming part of the previously mentioned connection between the firing means and the trigger operating means.

The arrangement is such that, during the operation of the mount to move the guns in train, the cam follower rotates relatively to the cam in such manner that, while the cam follower is in engagement with a low portion of the cam corresponding to the "fire" zone, the two pawls are in engagement with each other and the trigger operating means will be actuated to fire the guns when the firing pedal is actuated. However, as soon as the cam follower engages an elevated portion of the cam, it actuates the cam-operated pawl to cause it to swing in a direction to disengage it from the manually operated pawl, thereby breaking the connection between the firing means and the trigger operating means so that actuation of the firing pedal by the operator will be ineffective to fire the guns until the guns have been rotated through an arc corresponding to the predetermined "safe" or "no fire" area, as defined by the extent of the elevated portion of the cam. After passing this area, the cam follower again engages a low portion of the cam, causing the cam-operated pawl to swing in the reverse direction to a position in which, upon release of the firing pedal by the operator, the two pawls will again be brought into cooperative relation to permit resumption of the firing when the operator again depresses the firing pedal.

In accordance with another feature of the invention, there is provided means associated also with the gun elevating mechanism and cooperating with the above-mentioned cam follower to interrupt the firing in predetermined positions during the movement of the guns in elevation. As herein illustrated, the cam follower is carried by a rack slide mounted for reciprocating movement radially of the surface of the cam, the rack slide being actuated by a gear having a driving connection with one of the elevating gear segments secured to each gun cradle. The arrangement is such that, during the rotation of the guns in elevation, the cam follower is moved radially of the cam in such manner that, while the cam follower is in engagement with a depression of the cam, the guns can be fired. However, as soon as the cam follower engages an elevated portion of the cam, the previously mentioned cam-operated pawl is actuated to swing in a direction to disengage it from the manually operated pawl, as explained above, thereby to disconnect the firing means from the trigger operating means and to interrupt the firing until the guns have been moved past the "no fire" area as defined by the extent of the elevated portion of the cam, whereupon the cam follower rides off the elevated portion of the cam and the pawls are again brought into cooperative relation to permit resumption of the firing of the guns in the manner described above.

In order to provide against accidental firing of the guns when the mount is not in use, or until such time during the operation of the mount as the gunner may be ready to commence firing, there is provided, in accordance with a further feature of the invention, manually controlled safety means whereby the firing means may be disconnected from the trigger operating means so that the guns can not be fired by accidental actuation of the firing pedal. As herein illustrated, the manually controlled safety means comprises a hand lever connected by linkage to the firing means and movable between two positions corresponding to the "safe" and "fire" positions to actuate the manually operated pawl, when the lever is moved to the "safe" position, to cause the pawl to swing in one direction to disengage it from the cam-operated pawl, thereby to break the connection between the firing means and the trigger operating means, and to actuate the manually operated pawl, when the lever is moved to the "fire" position, to cause the pawl to swing in the opposite direction to reengage the cam-operated pawl. The lever is provided with a spring-pressed plunger arranged to lock it in either of its two positions, thereby to lock the manually operated pawl in its operative or inoperative position.

To insure ease and rapidity of movement of the guns and, at the same time, to afford fine and accurate control at varying speeds, the illustrated mount is provided with power driving means, preferably fluid pressure driving means controlled by a train control valve and an elevation control valve, operated by suitable control grips from a central station by a gun trainer who is seated between the guns and rotates with them in the horizontal plane, and who controls the movements of the guns in all directions, tracks the target, and fires the guns from the same station. Preferably the mount is also provided with alternative manual controls which may be used to rotate the guns in train and elevation in the event of the power failing during operation of the mount, or in the event there is no power available at the site of installation of the mount and, in accordance with a further feature of the invention, means is also provided whereby the gun training and elevating mechanisms may be easily and quickly disengaged from the power driving means and engaged with the manual controls. In manual operation, the gun trainer controls the rotation of the mount with the guns in train while the gun pointer controls the movement of the guns in elevation.

These and other features of the invention will now be described more fully with reference to the accompanying drawings and pointed out in the appended claims.

General organization of the mount

The illustrated gun mount comprises a base plate 20 (Fig. 1) to be fixed to the deck of a ship or to any other movable or stationary supporting structure, and a revolving plate 22 secured to a ring 24 which is rotatable about a ball bearing mounted in a raceway 26 formed around the base plate 20. Mounted to rotate with the plate 22 is a base housing 28, the upper surface of which constitutes a platform 30. Extending upwardly from the platform 30 are two spaced standards 32, each of which supports a cradle 34 mounted for swinging movement about a horizontal axis on a trunnion 36 journaled in the upper end portion of each standard 32. Each cradle 34 carries an adapter 37 which supports a gun G. Secured to the forward ends of the two cradles is a yoke 38 adapted to support a sighting device (not shown) arranged to move with the guns in train and elevation. A gunner's chair 39 is mounted between the cradle supporting standards 32, the chair being supported on a bracket 40 secured to the rear wall of a hollow control post 42 mounted on the platform 30. The chair 39 is adjustable heightwise as well as forwardly and rearwardly.

Power drive

The power means for rotating the mount in train and for moving the guns in elevation may be of any known type. In the construction shown, the power means consists of a fluid pressure drive, the principal elements of which are shown schematically in Fig. 3, and which includes a control valve mechanism generally indicated at 44. The control valve housing is mounted on a bracket 46 secured to the underside of the platform 30 below the control post 42 (see Fig. 1).

The control valve housing is provided with inlet and outlet ports which communicate with the pressure and exhaust sides, respectively, of a suitable source of pressure fluid (not shown). The control valve mechanism 44 comprises a train control valve which is connected by tubes 48 and 50 (Fig. 3) to the pressure and exhaust ports of a fluid pressure motor 52 connected to a train driving mechanism comprising a shaft 54 connected to the shaft of the motor 52. A worm 56 on the shaft 54 meshes with a worm gear 58 mounted on a vertical splined shaft 60 journaled in bearings in the control post 42 and in a worm gear housing (not shown) mounted upon the revolving base plate 22. Formed integral with the lower end of the worm gear shaft 60 is a pinion 62 which meshes with a ring gear 64 fixed to the stationary base 20. The control valve mechanism 44 also comprises an elevation control valve connected by tubes 66 and 68 to the pressure and exhaust ports of a fluid pressure motor 70 connected to a substantially vertical elevation drive shaft 72 journaled in bearings in an elevation drive column 74 (Fig. 1) secured to the platform 30 by bolts 76. A worm 78 on the shaft 72 meshes with a worm gear 80 mounted on a transverse shaft 82 journaled in bearings in a housing 84 secured to the elevation drive column 74. Fast on each end of the shaft 82 is a pinion 86 which meshes with an elevation gear segment 88 fixed to each of the gun cradles 34.

The train and elevation control valves are actuated to control the flow of pressure fluid to and from the motors 52 and 70 to operate the train and elevation driving mechanisms, by a pair of control grips 90 which are fixed to a transverse shaft 92 (Fig. 3) journaled in a valve control box 94 mounted on the upper end of an offset portion 95 of the control post 42 and arranged to be swung about a vertical axis to operate the train control valve, through connections to be described hereinafter, thereby to cause the mount and guns to be rotated in a horizontal plane. The valve control box 94 is provided with a bottom cover plate 96 (Fig. 1) which is secured to a flange 97 on the upper end of a downwardly extending hollow shaft 98 journaled in bearings provided in the upper and lower ends of the offset portion 95 of the control post 42. Clamped to the lower end of the shaft 98 is a collar 100 (Fig. 3) having a lateral projection 101 connected by a link 102 and a bell crank 104 to the operating rod of the train control valve. Accordingly, when the gunner swings the valve control box 94 about a vertical axis, the train control valve will be actuated to permit pressure fluid to flow to and exhaust from the train fluid pressure motor 52 and, through the driving connections 54, 56, 58, 60 and 62, to rotate the mount around the ring gear 64, the direction of such rotation corresponding to the direction of swinging movement of the valve control box 94 by the gunner. Rigidly mounted on the control grip shaft 92 is a block 106 (Fig. 3) to which is connected, by a ball and socket joint, the upper end of a rod 108 extending downward through the shaft 98, the lower end of the rod 108 being connected by a bell crank 110 to the operating rod of the elevation control valve. Accordingly, when the gunner swings the control grips 90 about the horizontal axis, the rocking of the grip shaft 92 will cause the elevation control valve to be actuated, through the connections just described, to allow pressure fluid to flow to and exhaust from the elevation fluid pressure motor 70, thereby causing the elevation driving mechanism to elevate or depress the guns, depending upon the direction of swinging movement of the control grips. Combined movement of the control grips in the vertical and horizontal planes will cause the guns to be moved simultaneously in train and elevation. The arrangement is such that the direction and extent of displacement of the control grips from neutral position determine the direction and speed of movement of the guns, the control valves being so constructed as to permit low initial speed with the grips substantially near zero position, and progressively higher speeds corresponding to increases in the amount of displacement of the grips from zero position. By this arrangement fine and accurate control is assured and the gunner is able to train and hold the guns on the target without great physical exertion. The mount and guns will continue to rotate as long as the grips are held displaced from neutral position, but may be stopped and held in any desired position of train and/or elevation simply by releasing the control grips, which will immediately be returned to neutral position, thereby closing the train and/or elevation control valve.

Figures 12, 13, 14, 15, 16:
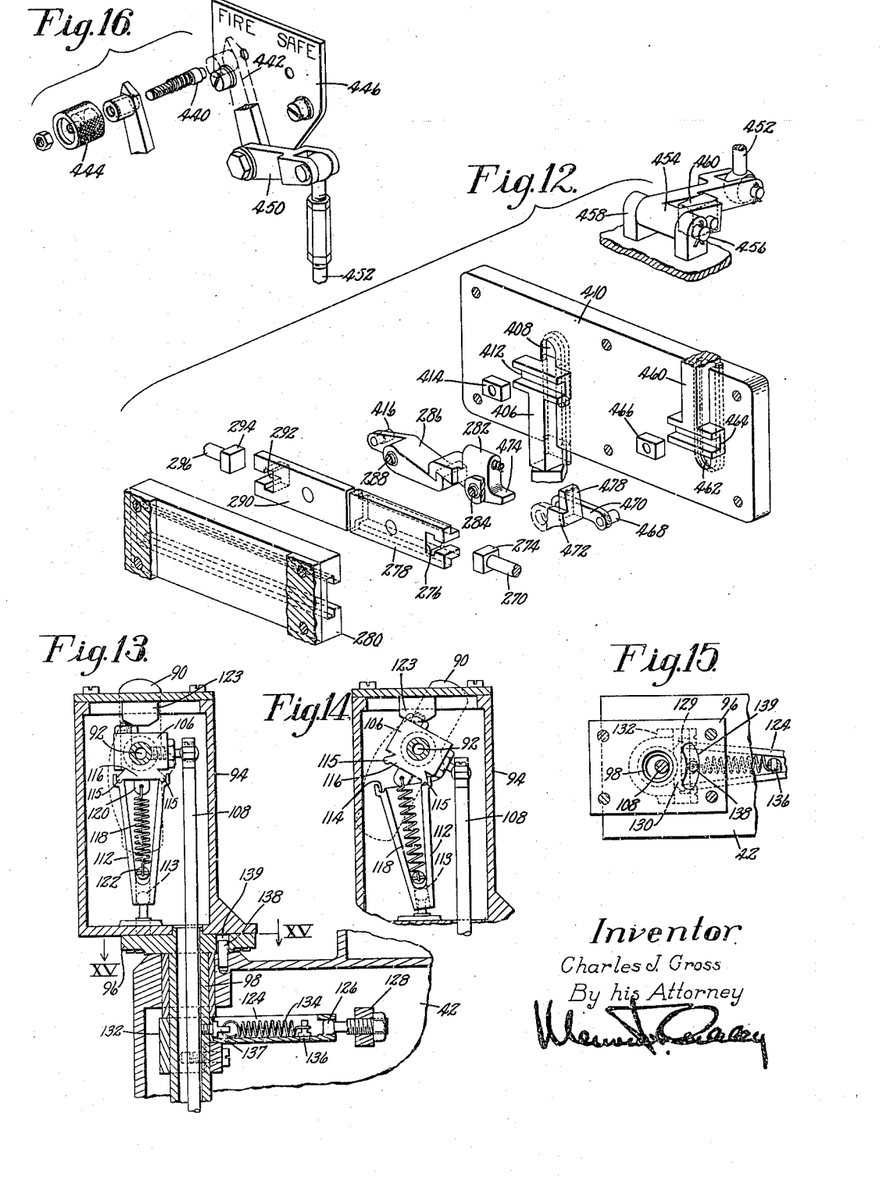
Fig. 12 is an exploded view of the parts shown in Figs. 7, 8 and 9.
Fig. 13 is a vertical cross-sectional view of a control post and of a valve control box mounted thereon and carrying the control grips, this view illustrating more particularly the centralizing means for automatically closing the elevation and training control valves upon release of the control grips.
Fig. 14 is a partial cross-sectional view similar to Fig. 13, this view showing parts of the elevation control valve centering mechanism in the position which they assume when the control grips are displaced from central position.
Fig. 15 is a sectional view along the line XV—XV of Fig. 13 illustrating parts of the train control valve centering mechanism in their normal positions.
Fig. 16 is a partial exploded view of the manual means for disengaging the manually operated pawl shown in Figs. 7, 8 and 9 from the cam-operated pawl to prevent accidental firing of the guns.

To insure that the rotation of the mount and guns in any direction will be instantly and positively stopped in any desired position, there is provided a control valve centering mechanism (Figs. 13, 14 and 15), comprising an elevation centering mechanism and a train centering mechanism, each constructed and arranged to cause the grips, upon being released by the gunner, to return to neutral position, thereby to close the respective control valves and stop the flow of pressure fluid to the motors 70 and 52 which drive the elevating and training mechanisms. As shown in Figs. 13 and 14, the elevation control valve centering mechanism comprises a substantially vertical V-shaped member 112 pivotally mounted in the valve control box 94. The member 112 is connected at its lower end to the bottom of the valve control box 94 by a ball and socket joint 113 arranged to permit the member 112 to yield downwardly as the control grip shaft 92 is rocked about its axis by the swinging of the control grips to elevate the guns. The upper ends of the arms of the V-shaped member 112 are provided with notches 114 (Fig. 14) arranged to engage the edges 115 of a dovetailed portion 116 of the block 106 mounted on the control grip shaft 92. A spring 118 is attached at its upper end to an eyebolt 120 threaded into the block 106 and at its lower end to a stud 122 mounted in the lower end of the V-shaped member 112. The spring 118 tends to hold the member 112 at all times in its normal position with the notches 114 in engagement with the edges 115 of the block 106 (see Fig. 13). However, when the grips 90 are swung about a horizontal axis to elevate or depress the guns, the rocking movement of the block 106 with the control grip shaft 92 will cause the V-shaped member to swivel about the joint 113 to the right or to the left (Fig. 14) relatively to the block 106, against the action of the spring 118. Rocking of the block 106 causes the elevation control valve actuating rod 108 to be moved upwardly or downwardly, depending upon the direction of swinging movement of the control grips, thereby to actuate the elevation control valve to elevate or depress the guns. Swinging movement of the control grips in either direction about the horizontal axis is limited by engagement of the upper surface of the block 106 with an abutment 123 extending downwardly from the under side of the top of the valve control box 94 (see Fig. 14). Upon release of the control grips by the gunner, the V-shaped member 112 is returned by the spring 118 to its normal position, thereby causing the block 106 to rock with the grip shaft 92 in the direction to assume its normal position in which the edges 115 on the dovetailed portion 116 of the block are in engagement with the notches 114 in the upper ends of the arms of the member 112 (Fig. 13). As a result of the return movement of the block 106 to its normal position, the elevation valve actuating rod 108 is returned to neutral position and the elevation control valve is closed, thereby stopping the rotation of the guns in elevation.

The train control valve centering mechanism is substantially similar to the mechanism just described for centering the elevation control valve. This train valve centering mechanism, as illustrated in Figs. 13 and 15, comprises a substantially horizontal V-shaped member 124 yieldingly mounted in the control post 42. One end of the V-shaped member 124 is connected by a ball and socket joint 126 to a bracket 128 provided in the interior of the control post 42. The opposite ends of the arms of the V-shaped member 124 are provided with notches similar to the notches 115 on the arms of the V-shaped member 112 of the previously described elevation valve centering mechanism, the notches being arranged to engage the edges 129 (Fig. 15) of a dovetailed portion 130 of a block 132 mounted on the shaft 98. Between the arms of the V-shaped member 124 is mounted a spring 134 which is attached at one end to a stud 136 mounted in one end of the V-shaped member and at its opposite end to an eyebolt 137 threaded into the block 132 and into the shaft 98. The spring 134 tends at all times to hold the V-shaped member 124 in its normal horizontal position, in which the notches on the ends of the arms of the member are engaged by the edges 129 of the block 132. However, when the gunner moves the control grips about a vertical axis to actuate the train control valve so as to rotate the mount and guns in the horizontal plane, the valve control box 94, the shaft 98, and the block 132 will be rotated as a unit and the V-shaped member 124 will swivel about the joint 126 relatively to the block 132 against the action of the spring 134, so that the notch on one of the arms of the member 124 is disengaged from the corresponding edge 129 of the block 132. Rotation of the valve control box 94 in either direction is limited by engagement of a pin 138 carried by the shaft 98 with either end of an arcuate slot 139 (Fig. 15) formed in the cover plate 96 of the valve control box 94. Upon release of the control grips by the gunner, the spring 134 will return the V-shaped member 124 to its normal horizontal position, in which the notches in the arms of the member are engaged by the edges 129 of the block 132, as a result of which the valve control box 94 and the shaft 98 will be returned to their inoperative positions, thereby closing the train control valve to stop the rotation of the mount.

*Manual control*

Figure 2:
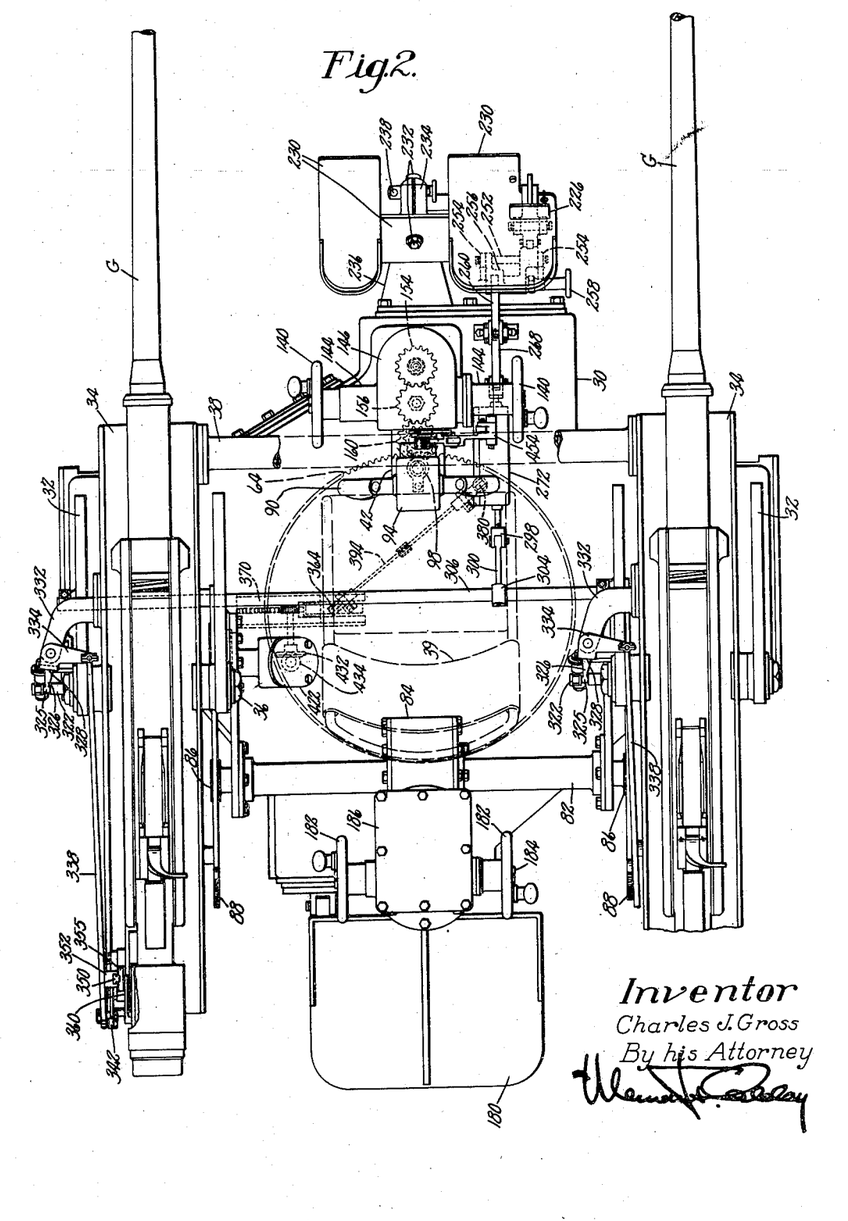
Fig. 2 is a top plan view of the mount.
Figure 3:
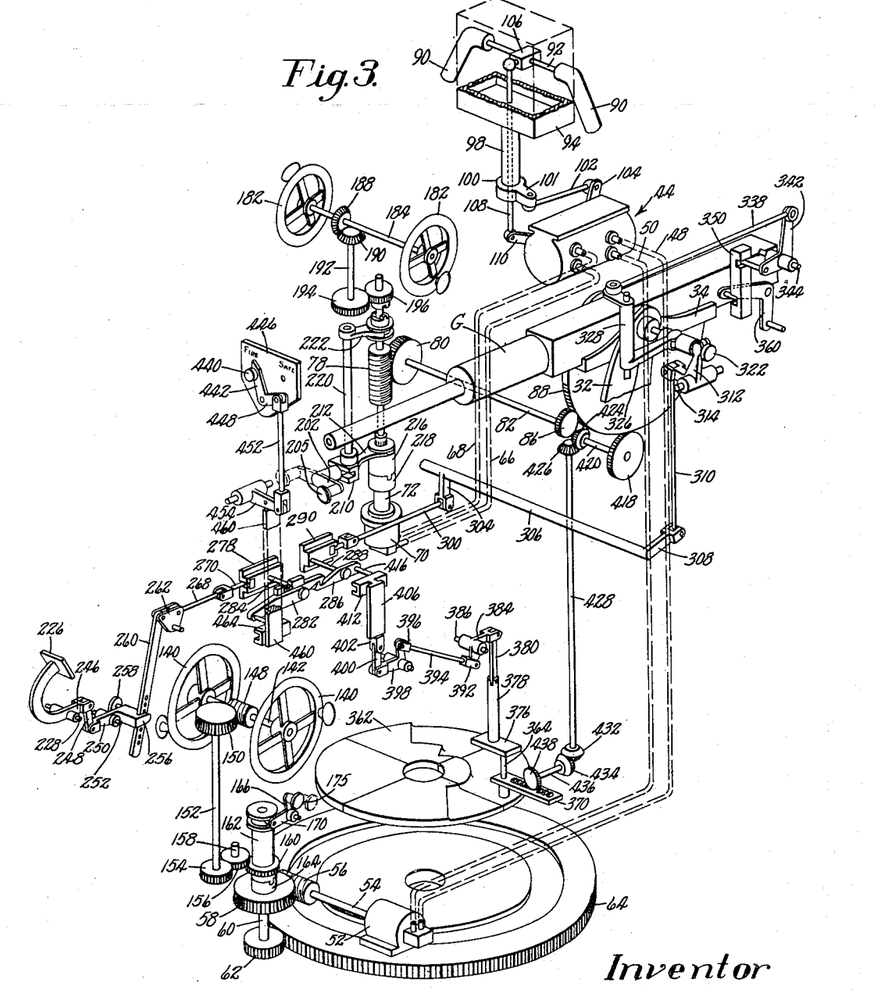
Fig. 3 is a perspective schematic view of the mount.
Figure 6:
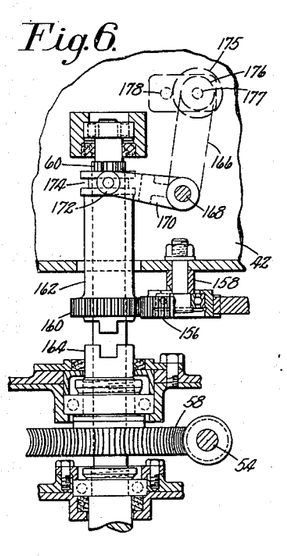
Fig. 6 is a vertical cross-sectional view of the gun training mechanism, showing the means for disengaging this mechanism from the power drive and engaging it with the manual controls.

The illustrated mount is provided with manual control means which may be used in place of the power control means for rotating the mount and for elevating or depressing the guns in the event that power is not available at the site of installation of the mount or in the event of failure of the power means during operation of the mount. The manual control means for rotating the mount to train the guns comprises a pair of hand wheels 140 (Figs. 1 and 3) which are fast on a transverse shaft 142 mounted in sleeves 144 (Fig. 2) extending laterally from a worm gear housing 146 (Fig. 1) mounted on the upper end of the control post 42. A worm 148 (Fig. 3) on the shaft 142 meshes with a worm gear 150 mounted in the housing 146. The worm gear 150 is fixed to the upper end of a shaft 152 which extends downwardly through the control post 42 and into the base housing 28. The lower end of the shaft 152 carries a gear 154 which meshes with an idler gear 156 (Figs. 1, 3 and 6) mounted on a short vertical shaft 158 supported in a bearing in the lower end of the control post 42. The idler gear 156 is arranged to engage a gear 160 formed integral with a clutch sleeve 162 slidably mounted on the shaft 60. The clutch sleeve 162 is normally in engagement with a driving clutch member 164 fast on the shaft 60, when the mount is power operated, as shown in Figs. 1 and 3, but may be disengaged therefrom and moved upwardly to bring the gear 160 into driving engagement with the idler gear 156, thereby to connect the train mechanism to the manual control means, as shown in Fig. 6.

The means for shifting the clutch sleeve 162 out of engagement with the driving clutch member 164 comprises a hand lever 166 (Figs. 1 and 6) fast on a rockshaft 168 journaled in a side wall of the control post 42. Also fast on the rockshaft 168 is a fork 170 the arms of which carry blocks 172 which engage an annular groove 174 formed in the upper end of the clutch sleeve 162. The hand lever 166 is provided with a knob 175 mounted on a spring-pressed plunger 176 having a taper pin 177 which is arranged to engage in either of two openings 178 provided in the previously mentioned side wall of the control post 42. During power operation of the mount, the taper pin 177 of the plunger 176 engages the opening 178 at the left, as shown in Fig. 1. To rotate the mount manually, the operator pulls the knob 175 to disengage the taper pin 177 from the lefthand opening 178 and moves the hand lever 166 to the right, as shown in Fig. 6, where the taper pin 177 engages the corresponding opening 178. Movement of the hand lever 166 to the right causes the rockshaft 168 and the fork 170 to swing in a clockwise direction (Fig 6), thereby moving the clutch sleeve 162 upwardly out of engagement with the driving clutch member 164 and bringing the gear 160 into engagement with the idler gear 156. With the gears 160, 156 and 154 in driving engagement with one another, rotation by the operator of the hand wheels 140 will cause rotation of the shaft 60 and with it rotation of the pinion 62 around the ring gear 64 to rotate the mount in clockwise or counterclockwise direction, depending upon the direction of rotation of the hand wheels.

Figure 1:
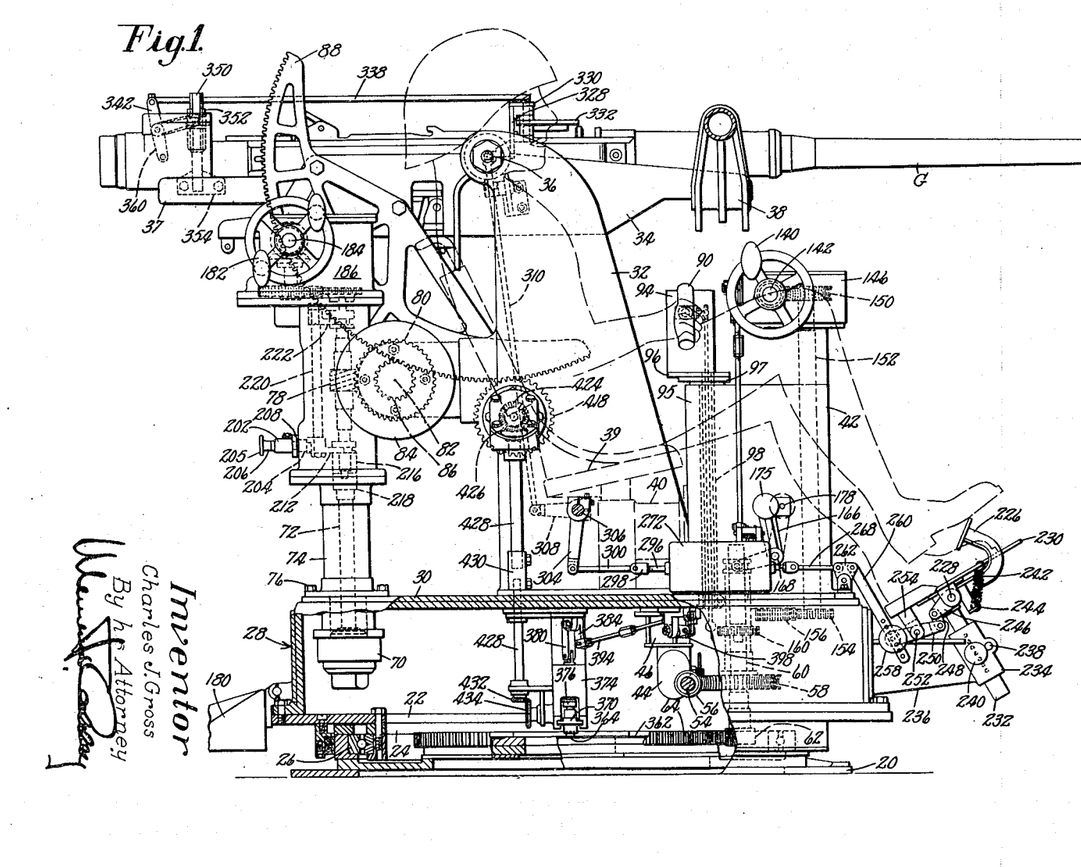
Fig. 1 is a view partly in right-hand side elevation and partly in section of a gun mount embodying the present invention.
Figure 5:
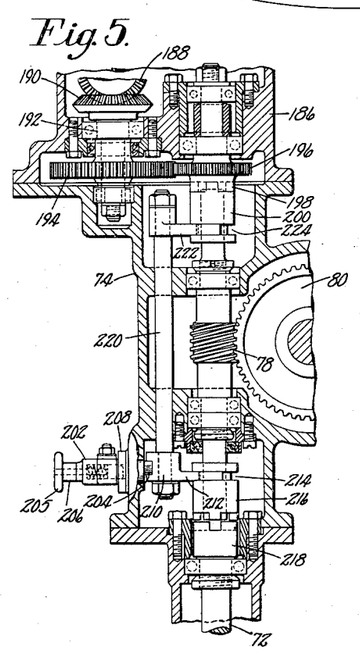
Fig. 5 is a vertical cross-sectional view of part of an elevation drive column, illustrating the means for disengaging the gun elevating mechanism from the power drive and engaging it with the manual controls.

Manual elevation of the guns is under the control of a gun pointer who stands upon a platform 180 (Fig. 1) hinged to the rear wall of the housing 28 and operates a pair of hand wheels 182 fast on a transverse shaft 184 (Figs. 1 and 3) mounted in bearings in a housing 186 secured to the top of the elevation drive column 74 (Fig. 1). Fast on the shaft 184 is a bevel gear 188 (Figs. 3 and 5) which meshes with a bevel gear 190 on the upper end of a vertical shaft 192 journaled in a bearing in the bottom of the housing 186. The lower end of the shaft 192 carries a gear 194 which meshes with a gear 196 formed integral with a clutch member 198 (Fig. 5) mounted on the upper end of the shaft 72. The clutch member 198 is arranged to engage a clutch sleeve 200 slidably mounted on the shaft 72 thereby to connect the gun elevating mechanism to the manual control means. For thus bringing the clutch sleeve 200 into engagement with the clutch member 198, there is provided a clutch shifting hand lever 202 which is fast on an eccentric shaft 204 journaled in a bearing in the elevation drive column 74. The hand lever 202 is provided with a knob 205 mounted on a spring-pressed plunger 206 having a taper pin (not shown) which is arranged to engage either of two openings provided in a plate 208 secured to the column 74. The eccentric shaft 204 engages in a groove formed in a block 210 integral with a laterally extending fork 212. The fork 212 engages in an annular groove 214 formed in a clutch sleeve 216 which is slidably mounted on the shaft 72 and is normally in engagement with a clutch member 218 fast on the shaft 72, when the mount is power operated, as shown in Fig. 1. The fork 212 is mounted on the lower end of a vertical rod 220 (Figs. 1 and 5) on the upper end of which is mounted a fork 222 engaging an annular groove 224 formed in the clutch sleeve 200. When the clutch shifting hand lever 202 is moved from the position shown in full lines in Fig. 3 to the position shown in dotted lines, the clutch sleeve 200 is moved upwardly into engagement with the clutch member 198 to connect the shaft 72 to the manual control means, while, at the same time, the clutch sleeve 216 is moved upwardly out of engagement with the clutch member 218 to disconnect the shaft 72 from the power control means. When, thereafter, the gunner rotates the hand wheels 182 the guns will be swung to elevate or depress the gun barrels, depending upon the direction of rotation of the hand wheels.

*Trigger operating mechanism*

The guns are fired from a pedal 226 (Figs. 1, 2 and 3) pivoted at 228 to a foot rest 230 secured to a post 232 (Fig. 1) mounted for heightwise adjustment in a split sleeve 234 formed integral with a bracket 236 secured to the front wall of the housing 28, the sleeve being clamped to the post 232 by means of a clamping screw 238. The post 232 is provided with a plurality of bores within any one of which a spring-pressed locking plunger 240 mounted in the sleeve 234 is arranged to engage to lock the post in its adjusted position. To adjust the heightwise position of the foot rest 230 to suit the convenience of the operator, the clamping screw 238 is slackened to loosen the sleeve 234 and the locking plunger 240 pulled out of the bore in the foot rest supporting post 232 with which it is in engagement. The foot rest and the post may thereafter be moved bodily up or down until the desired heightwise position of the foot rest has been obtained, whereupon the locking plunger 240 is allowed to engage in another bore in the post to lock the post in its adjusted position and the sleeve 234 is clamped thereto by retightening the clamping screw 238.

The pedal 226 is actuated against the resistance of a spring 242 attached at one end to the foot rest 230 and at its other end to a downwardly extending lug 244 of the pedal 226. The pedal has a rearwardly extending arm 246 which is connected by a link 248 to one arm of a two-arm lever 250 pivoted at 252 to downwardly projecting lugs 254 of the foot rest 230. The other arm of the lever 250 is provided with a bifurcated portion 256 to which is connected by means of a spring-pressed locking plunger 258 the lower end of an inclined adjustable link 260 forming part of the trigger actuating means. The link 260 is provided with a plurality of holes corresponding in number to the number of bores in the previously mentioned foot rest supporting post 232 (see Fig. 1), and in any one of which the plunger 258 is arranged to engage to lock the link in its adjusted position, the arrangement being such that any heightwise adjustment of the foot rest 230 must be accompanied by a corresponding adjustment of the link 260 in order to maintain undisturbed the leverage between the foot rest and the link. To effect this adjustment of the link the locking plunger 258 is pulled out of one hole in the link and inserted in another hole, corresponding to the bore in the post 232 in which the locking plunger 240 has been inserted, to lock the link in its adjusted position.

The upper end of the link 260 is connected to one end of a rocker arm 262 (Figs. 1, 3 and 7) pivoted at 264 to a bracket 266 secured to the forward end of the platform 30. The other end of the rocker arm 262 is connected by a link 268 to one end of a longitudinal rod 270 (Fig. 7) extending into a trigger lock housing 272 secured to the platform 30. The other end of the rod 270 carries a block 274 (Fig. 12) which fits in a slot 276 formed in a slide 278 mounted for longitudinal reciprocating movement in a slideway 280 secured to an inner wall of the housing 272. A spring-pressed pawl 282 (Fig. 12) is pivoted at 284 on the slide 278 and is normally in engagement with a pawl 286 pivoted at 288 on a slide 290 mounted for longitudinal reciprocating movement in the previously mentioned slideway 280, the slide 290 being provided with a slot 292 (Fig. 12) for the reception of a block 294 mounted on one end of a longitudinally extending rod 296. The other end of the rod 296 (Fig. 7) is threaded into a clevis 298, to which is connected one end of a link 300 the other end of which is pivotally connected at 302 to a bifurcated portion of a lever 304 (Figs. 1 and 3) rigidly secured to a transverse rockshaft 306 mounted in bearings in the two gun cradle supporting standards 32. Also rigidly secured to each end of the rockshaft 306 is a rearwardly extending lever 308 having a bifurcated portion to which is pivotally connected the lower end of an upwardly extending rod 310, the upper end of which is connected to one arm of a bell crank 312 (Fig. 10) mounted on a pivot stud 314 carried by a bracket 316 secured to the upper end of each gun cradle supporting standard 32. The other arm of the bell crank 312 is provided with a bifurcated portion 318 which engages a portion of reduced diameter 320 of a trunnion center pin 322. A second portion of reduced diameter 324 of the pin 322 is engaged by the bifurcated portion 325 of a lateral projection 326 of a substantially vertical arm 328 of a bell crank 330 mounted on a pivot stud 331 carried by a bracket 332 secured to each gun cradle 34. The other arm 334 of the bell crank 330 is connected by a ball and socket joint 336 to the forward end of a longitudinally extending rod 338 (Fig. 10), the rear end of which is connected by a ball and socket joint 340 to one arm of a bell crank 342 mounted on a stud 344 carried by a bracket 346 secured to the rear end of each cradle 34. The other arm of the bell crank 342 carries at its forward end a block 348 (Fig. 11) which engages in a groove 349 provided in one side of a slide 350 mounted for vertical reciprocating movement in a slideway 352 (Fig. 10) formed integral with a bracket 354 secured to each gun adapter 37. The opposite side of the slide 350 is formed with a guideway 355 (Fig. 11) which is engaged by a roll 356 mounted on a pin 358 carried by one arm of a trigger bell crank 360 with which each gun is provided.

Figures 10, 11:
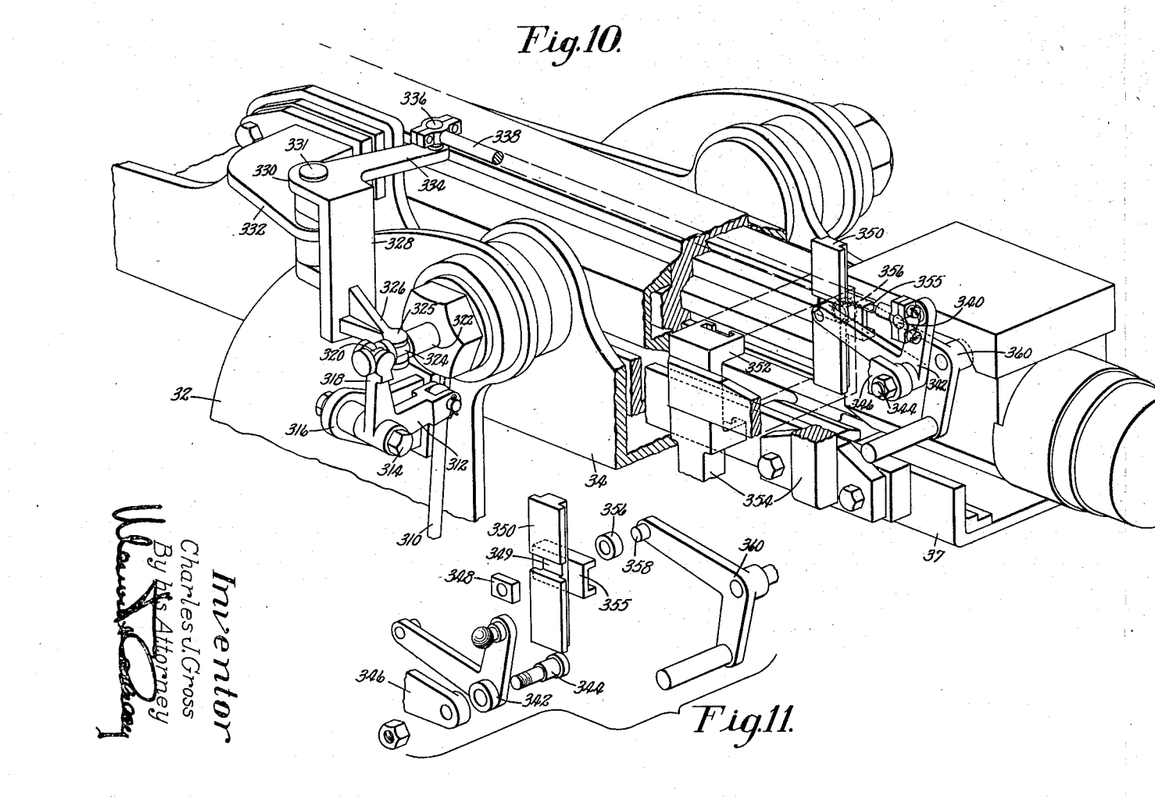
Fig. 10 is a perspective view of the upper portion of the gun mount, showing parts of the connection between the firing pedal and the gun triggers.
Fig. 11 is an exploded view of part of the trigger operating mechanism.

From the above description it will be evident that when the firing pedal 226 is depressed, the linkage from the pedal to the rod 338 (Figs. 1, 3 and 10) connected to the trigger operating mechanism of each gun will actuate the rod to move forwardly, thereby causing the bell crank 342 to swing in a counterclockwise direction, as viewed in Fig. 10, and, by reason of the connection between this bell crank and the slide 350, causing the slide to move downwardly in the slideway 352. Downward movement of the slide 350 will actuate the trigger bell crank 360, which is similarly connected to the slide, to swing in a counterclockwise direction, as viewed in Fig. 10, to operate the firing mechanism of the gun. It will be understood that, in the operation of automatic guns, the firing of the guns will continue as long as the pedal 226 is held depressed and will cease upon release of the pedal.

Fire interrupting mechanism

In the operation of remotely controlled automatic guns mounted on the deck of a ship, for example, for use against rapidly moving targets, such as hostile airplanes, it is important to guard against the danger of hitting parts of the ship or other friendly objects which might come within the range of fire of the guns, and to accomplish this without requiring any attention on the part of the gunner. In the illustrative embodiment of the present invention, this object is attained by the provision of a fire interrupting mechanism constructed and arranged to interrupt automatically the firing of the guns in predetermined positions of train and elevation by rendering the trigger operating mechanism inoperative until the guns have been moved past an area designated beforehand as the "danger" or "no fire" area. It is to be noted that the fire interrupting mechanism, in accordance with the invention, is operative irrespective of whether the movements of the guns are controlled by the power means or by the manual controls.

Figure 4:
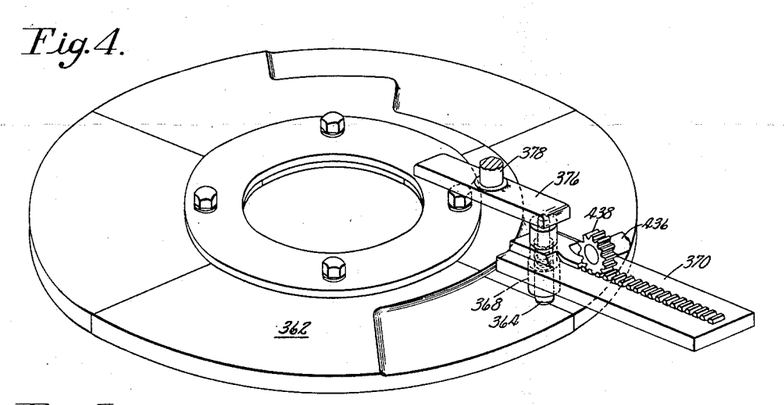
Fig. 4 is a detail view showing a cam and part of the mechanism cooperating with the cam to interrupt the firing of the guns in predetermined positions of train and elevation.
Figures 7, 8, 9:
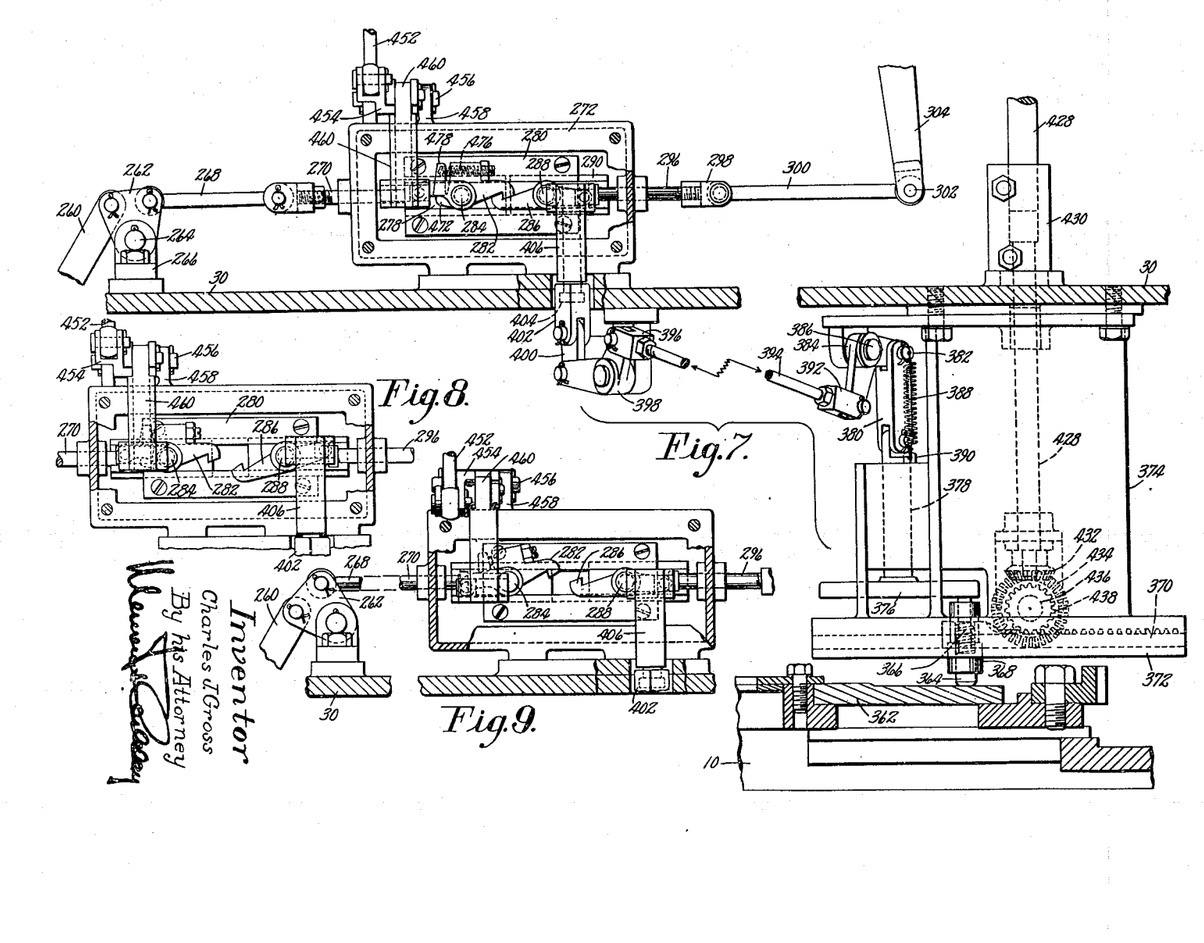
Fig. 7 is a view partly in left-hand side elevation and partly in section of a portion of the front part of the mount, illustrating more particularly the fire interrupting mechanism, this view showing a cam-operated pawl and a manually operated pawl engaged with each other when the cam follower is in engagement with a depression of the cam.
Fig. 8 is a view of a portion of the fire interrupting mechanism shown in Fig. 7, this view showing the cam-operated pawl disengaged from the manually operated pawl after the cam follower has engaged an elevated portion of the cam.
Fig. 9 is a view substantially similar to that of Fig. 8, this view showing the manually operated pawl disengaged from the cam-operated pawl to prevent accidental firing of the guns.

Referring to Figs. 3, 4 and 7, this mechanism is shown comprising a cam plate 362 secured to the base 10. The cam plate 362 is provided with low and high portions corresponding to predetermined "fire" and "no fire" areas, and is preferably made in a plurality of segments to facilitate the removal of one or more of them for the purpose of substituting other segments of different shapes to conform to the particular areas which it may be desired to protect. Cooperating with the cam 362 is a cam follower comprising a cam pin 364 surrounded by a compression spring 366 mounted in a bushing 368 provided in a rack slide 370 mounted for reciprocating movement radially of the cam plate 362 in a slideway 372 formed integral with a bracket 374 secured to the under side of the platform 30 to rotate with the mount in the horizontal plane. The lower end of the cam pin 364 engages the surface of the cam 362, while its upper end abuts against the under surface of a plate 376 arranged to yield heightwise when the lower end of the cam pin 364 rides onto a high portion of the cam, thereby to render the trigger operating mechanism inoperative in a manner to be described hereinafter. An upwardly extending bar 378, formed integral with the plate 376, is connected to the lower end of a link 380, the upper end of which is connected by a pin 382 to one arm of a bell crank 384 mounted on a pivot 386 carried by the bracket 374. The bell crank 384 is under the action of a spring 388 connected at one end to the pin 382 and at its other end to an eyebolt 390 threaded into the bracket 374. The other arm of the bell crank 384 is connected by a clevis 392, a rod 394, and a clevis 396 to one arm of a bell crank 398, the other arm of which is connected by a link 400 to a clevis 402 connected at 404 to a slide 406 (Figs. 7 and 12) mounted for vertical movement in slideway 408 provided in the inner surface of a side wall 410 of the trigger lock housing 272. The slide 406 is formed with a guideway 412 (Fig. 12) for the reception of a block 414 mounted on a pin 416 carried by the pawl 286. The arrangement is such that, during the rotation of the mount in the horizontal plane, as the lower end of the cam pin 364 rides onto an elevated portion of the cam 362, the plate 376, together with the bar 378 and the link 380, is moved upward, as a result of which the bell crank 384 swings counterclockwise about its pivot 386 (Fig. 7) and the bell crank 398 swings clockwise, thereby moving the link 400 and the slide 406 upward in the slideway 408. Upward movement of the slide 406 causes the pawl 286 to which it is connected to swing in a counterclockwise direction about its pivotal connection 288, as shown in Fig. 8, thereby to disengage it from the pawl 282. Consequently, depression of the firing pedal 226, while the pawls 282 and 286 are disengaged from each other, will not actuate the gun triggers because, while the rod 270 connected to the pawl 282 will be pulled forward, the rod 296 connected to the pawl 286 will remain stationary until the cam pin 364 has moved off the high portion of the cam 362 to allow the pawl 286 to swing in a clockwise direction to a position in which it will again be engaged by the pawl 282 when the operator releases the firing pedal to allow the rod 270 to move rearwardly.

The fire interrupting means just described serves to render the trigger operating mechanism inoperative to fire the guns in predetermined positions during the movement of the guns in train. For similarly rendering the trigger operating mechanism inoperative in predetermined positions during the movement of the guns in elevation, there is provided, in accordance with the invention, further means associated with the gun elevating mechanism and arranged to cooperate with the already described cam operated means for interrupting the firing during movement of the guns in train. As illustrated in Figs. 1, 3 and 7, the means for automatically interrupting the firing of the guns in predetermined positions during the movement of the guns in elevation comprises a gear 418 which meshes with one of the elevation gear segments 88 secured to the gun cradles 34. The gear 418 is fixed to one end of a short transverse shaft 420 (Fig. 3) journaled in a housing 422 (Fig. 2) secured to the inner side of one of the gun cradle supporting standards 32. The other end of the shaft 420 carries a bevel gear 424 (Fig. 3) which meshes with a bevel gear 426 fast on the upper end of a downwardly extending two-part shaft 428 rotatably mounted in bearings provided in the housing 422 and in the bracket 374, the two parts of the shaft being rigidly connected by a coupling 430 (Figs. 1 and 7). The lower end of the shaft 428 carries a bevel gear 432 which meshes with a bevel gear 434 fixed to one end of a horizontal shaft 436 the other end of which carries a pinion 438 which meshes with the teeth of the rack slide 370. The arrangement is such that, as the gun cradles are rotated to elevate or lower the gun barrels, the gear 418 will be rotated by the gear segment 88 in clockwise or counterclockwise direction, depending upon the direction of rotation of the gun cradles. Rotation of the gear 448 will cause the shaft 428 to rotate and, through the gearing 432, 434, and 438, will cause the rack slide 370 to be moved radially of the cam 362, thereby to move the cam pin 364 toward and away from the center of the cam. So long as the cam pin rides in contact with a depression of the cam the guns will be fired by actuation of the firing pedal 226. However, as soon as the cam pin 364 rides onto a high portion of the cam, the plate 376, bar 378 and link 380 (Fig. 7) will be moved upward against the resistance of the spring 388, thereby causing the pawl 286 to be swung in a direction to disengage it from the pawl 282 in the manner already explained above, thus breaking the connection between the pedal 226 and the trigger operating mechanism.

In addition to the cam-operated means hereinbefore described for automatically interrupting the firing of the guns in certain predetermined positions of the guns during the operation of the mount, there is also provided manually controlled safety means for disconnecting the firing pedal from the trigger operating mechanism until the gunner is ready to commence firing, thereby to insure against accidental firing of the guns by inadvertent actuation of the firing pedal. As illustrated in Figs. 3 and 16, the safety means includes a spring-pressed plunger 440 carried by an index finger 442 and provided with a knurled knob 444. The index finger 442 cooperates with a plate 446 secured to the rear end wall of the control post 42 facing the gunner (see Fig. 1), the plate being provided with two openings corresponding to the "fire" and "safe" positions of the index finger, and in either of which the plunger 440 is arranged to engage when the index finger 442 is moved from one position to the other. The index finger 442 forms one arm of a bell-crank lever 448 pivotally mounted on the plate 446. The other arm 450 (Fig. 16) of the bell-crank lever 448 is provided with a bufurcated portion to which is pivotally connected a downwardly extending pull rod 452 the lower end of which is connected to a bifurcated portion of a substantially horizontal rocker lever 454 (Figs. 3 and 12) mounted on a stud 456 carried by a bracket 458 secured to the top of the platform 30. The lever 454 is connected to a slide 460 mounted for vertical reciprocating movement in a slideway 462 formed in the inner surface of the side wall 410 of the trigger lock housing 272. the slide 460 is formed with a guideway 464 for the reception of a block 466 (Fig. 12) mounted on a pin 468 carried by a rearwardly extending arm 470 of a pawl tripping member 472 mounted on the pivot 284 on which is also mounted the pawl 282, the member 472 being connected to the pawl by a projection 474 extending rearwardly from the pawl and engaging in a recess provided in the pawl tripping member 472. A spring 476 (Fig. 7) is interposed between the pawl 282 and an upwardly extending lug 478 of the pawl tripping member 472. Accordingly, when the index finger 442 is moved to the "safe" position, that is, to the right of Figs. 3 and 16, the bell-crank lever 448 will be swung in a clockwise direction and the rod 452 will be moved downwardly. Downward movement of the rod 452 will cause the slide 460 to move downwardly in the slideway 462, as shown in Fig. 9, thereby causing the pawl tripping member 472 to actuate the pawl 282 to swing in a counterclockwise direction to disengage it from the cam-operated pawl 286. As was explained above, while the pawls 282 and 286 are disengaged from each other, actuation of the firing pedal 226 will not operate to fire the guns, since the connection from the firing pedal to the trigger operating mechanism is broken. When it is desired to fire the guns, the index finger 442 must be moved to the "fire" position relatively to the plate 446, whereupon the slide 460 will be moved upward and cause the pawl 282 to swing in a clockwise direction into engagement with the pawl 286, the spring 476 allowing the pawl 282 at this time to yield slightly upward to permit the hooked end of the pawl 286 to slip into locking engagement with the hooked end of the pawl 282.

It should be noted that, while the pawls 282 and 286 may be disconnected by either the previously described cam operated means or the manually controlled means, just described, to render operation of the firing pedal ineffective to actuate the gun triggers in predetermined positions of the guns or in all positions thereof, the reengagement of the pawls requires, under certain conditions, the cooperation of both of the said means in order to render operation of the firing pedal effective to fire the guns when desired. Thus, for example, if the pawl 282 has been moved out of operative position by movement of the index finger 442 to the "safe" position, the cam operated means cannot cause the pawls to become reengaged until the pawl 282 has been moved to its operative position by movement of the index finger to the "fire" position. Conversely, if, while the pawl 282 is in operative position, the pawl 286 has been moved out of operative position by the cam operated means to render the firing pedal ineffective to actuate the gun triggers while the guns are moved through certain angles of train and elevation, the pawls will not be reengaged until the guns have been moved into a position in which the pawl 286 will be actuated by the cam operated means to return it to the position in which it will reengage the pawl 282 upon the next depression of the firing pedal. This arrangement provides a maximum of safety, insuring that the guns will be fired only when necessary and when they are pointed in certain predetermined positions.

*Operation*

While the operation of the mount will be apparent from the previous description, it will now be briefly summarized. It is to be understood that when the movements of the guns in train and elevation are controlled by the power means, a single operator, known as the gun trainer, seated in the chair 39 between the guns, controls the movements of the guns in all directions, scanning the target through the sighting device mounted between the guns, and fires the guns by actuating the firing pedal 226. On the other hand, when the movements of the guns are effected by the manual controls, the gun trainer, without leaving his station, rotates the mount to move the guns in train, continuing to track the target and firing the guns as in the case of power control, while the movements of the guns in elevation will be under the control of a gun pointer standing on the platform 180 at the rear of the mount.

Assuming the mount to be at rest and the movements of the guns to be controlled by the power means, the gun trainer turns on the power to start the motor which drives the pump. He then grasps the control grips 90 and rotates them about a vertical axis to rotate the mount and the guns in the horizontal plane, and about a horizontal axis to elevate or depress the guns. It will be recalled that the direction and extent of displacement of the grips from their neutral position determines the direction and speed of movement of the guns. Should the gun trainer desire to stop the rotation of the guns and to hold them in any position, it is sufficient for him to release the control grips which, as previously explained, will be automatically returned to their neutral positions by the spring-actuated centralizing mechanisms associated with the grips. If there be no power at the site of installation of the mount or if, for any reason, the power fails during the operation of the mount, the gun trainer may rotate the guns manually in the horizontal plane by pulling the plunger 176 out of the left-hand opening 178 (see Fig. 1) in the control post 42 and moving the hand lever 166 to the right, allowing the plunger to engage in the right-hand opening 178. Thereby the gun training mechanism will be disconnected from the power means and connected to the manual controls, after which the mount may be rotated by rotation of the hand wheels 149. Similarly, to rotate the guns in elevation, the gun pointer will pull the plunger 206 (Fig. 1) out of the right-hand opening in the plate 208 and move the hand lever 202 counterclockwise, allowing the plunger to engage in the left-hand opening in the plate. Thereby the gun elevating mechanism will be disconnected from the power means and connected to the manual controls, after which the guns may be elevated or depressed by rotation of the hand wheels 182.

When the gun trainer is ready to commence firing, he moves the index finger 442 (Fig. 3) from "safe" to "fire" position relatively to the plate 446 on the control post 42 in order to cause the pawl 282 to engage the pawl 286 (Figs. 3, 7), thereby to establish the operative connection between the firing pedal and the trigger operating mechanism, after which he depresses the firing pedal 226 to actuate the gun triggers. The guns will continue to be fired as long as the firing pedal is held depressed or until all the rounds have been fired. However, at predetermined points during the movements of the guns in either train or elevation, or both, the cam pin 364 will engage an elevation of the cam 362 and will cause the pawl 286 to swing in a direction to disengage it from the pawl 282, thereby breaking the connection between the firing pedal and the trigger operating mechanism. Thereafter the guns will continue to rotate, without firing, until they have been moved past an angle or angles of train or elevation, or both, corresponding to areas designated beforehand as "no fire" or "danger" zones. After these areas have been passed, the cam pin 364 will ride off the elevation of the cam and the pawl 286 will swing in the reverse direction to a position in which, upon actuation of the firing pedal 226, it will reengage the pawl 282 to permit resumption of the firing. At the end of the action, the gun trainer releases the firing pedal and the control grips (if the power controls have been used), the power is shut off, and the index finger 442 moved back to "safe" position.

Having described my invention, what I claim as new and desire to secure by Letters Patent of the United States is:

1. In a gun mount having a rotatable support, a gun mounted on said support for pivotal movement relative thereto, a trigger on said gun, and manually operated firing means for actuating said trigger, the combination comprising connections between said firing means and the trigger including a pair of normally coacting members, automatic means actuated, in certain predetermined positions of the gun, to cause relative movement between said coacting members so as to render the firing means ineffective, and means operable at will for causing relative movement between said coacting members to render the firing means ineffective to actuate the trigger in all positions of the gun.

2. In a gun mount having a rotatable support, a gun pivotally mounted thereon, a trigger on said gun, and an operating treadle for actuating the trigger, the combination comprising a first member connected to the trigger, a second member connected to the operating treadle, said members being normally in mutual engagement to permit actuation of the trigger, means acting automatically, in predetermined positions of the gun, to move said first member out of engagement with said second member to prevent firing of the gun in such positions, and means operable at will to move said second member out of engagement with said first member to prevent firing of the gun in any position thereof.

3. In a gun mount having a rotatable support, a plurality of guns mounted on said support for pivotal movement relative thereto, means for moving said guns in train and elevation, a trigger on each gun, and single firing means for operating all the triggers simultaneously, the combination comprising connections between said firing means and the triggers including a pair of normally coacting members, cam operated control means connected to one of said coacting members and to the gun training and elevating means and actuated, in certain predetermined positions of the guns, to move said member out of engagement with the other member, means operable at will to move said other coacting member into and out of engagement with said first coacting member, to render operation of the firing means effective or ineffective regardless of the positions of the guns.

CHARLES J. GROSS.

REFERENCES CITED

The following references are of record in the file of this patent:

UNITED STATES PATENTS

| Number | Name | Date |
|---|---|---|
| 407,487 | Maxim | July 23, 1889 |
| 950,576 | Paulson | Mar. 1, 1910 |
| 1,504,394 | Sutton et al. | Aug. 12, 1924 |
| 1,651,699 | Halsey | Dec. 6, 1927 |
| 2,142,132 | Joyce | Jan. 3, 1939 |
| 2,189,202 | Garland | Feb. 6, 1940 |
| 2,271,445 | Tarris et al. | Jan. 27, 1942 |
| 2,349,101 | Lesnick | May 16, 1944 |
| 2,378,670 | Walle et al. | June 19, 1945 |
| 2,397,577 | Trimbach et al. | Apr. 2, 1946 |

FOREIGN PATENTS

| Number | Country | Date |
|---|---|---|
| 461,824 | Great Britain | Feb. 25, 1937 |
| 783,291 | France | Apr. 1, 1935 |
| 787,298 | France | July 1, 1935 |